United States Patent Office 3,501,159
Patented Mar. 17, 1970

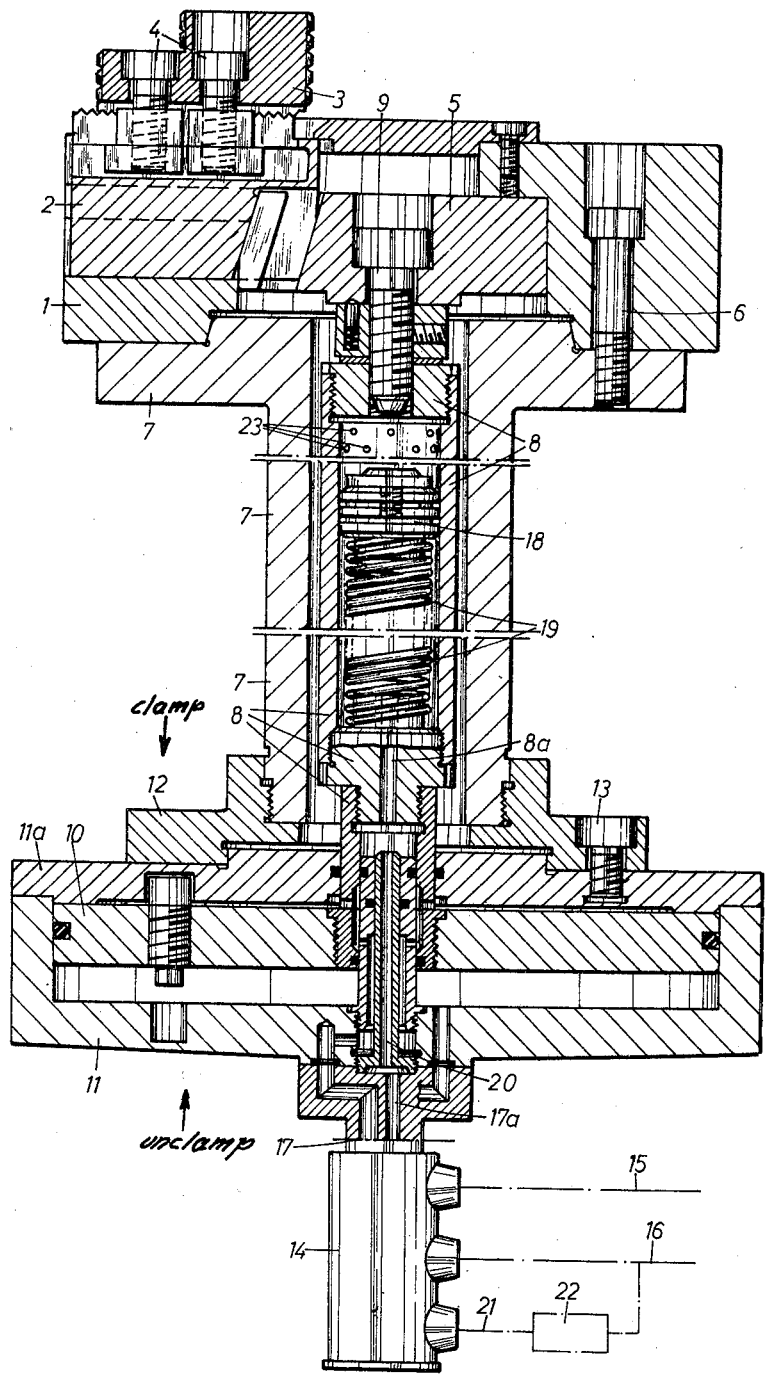

3,501,159
DEVICE FOR ACTUATING CLAMPING TOOLS, ESPECIALLY JAW CHUCKS ON MACHINE TOOLS
Hans Scharfen, Buderich, near Dusseldorf, Germany, assignor to Paul Forkardt Kommanditgesellschaft, Dusseldorf, Germany
Filed Apr. 22, 1968, Ser. No. 722,947
Int. Cl. B23b *31/30, 31/10*
U.S. Cl. 279—4          5 Claims

ABSTRACT OF THE DISCLOSURE

Jaw chuck for machine tools having a cam connected to the jaws to move them in opening and closing directions and a fluid pressure operated actuator for the cam, and an impact device operable to deliver an impact to the cam, at least upon closing of the jaws, when a certain pressure has built up in the actuator thereby to assist the actuator in overcoming friction encountered by the cam and jaws.

---

The present invention concerns a device for actuating clamping tools, especially jaw chucks, on machine tools. With clamping tools of this type, which are equipped with a compressed air cylinder the piston of which is through the intervention of a pull rod connected with the adjusting member of the clamping tool, considerable friction may occur during the clamping operation. These forces of friction may bring about that the clamping operation is not effected completely so that there exists the danger that the clamped-in workpiece will sooner or later get loose.

It is an object of the present invention to provide a device which will overcome the above mentioned drawbacks.

It is another object of this invention to provide a device for actuating clamping tools comprising a compressed air cylinder which will be able to produce a post-clamping effect by temporarily eliminating or reducing the friction occurring during the clamping operation.

These and other objects and advantages of the invention will appear more clearly from the following specification in connection with the accompanying drawing.

The device according to the present invention for actuating clamping tools, especially jaw chucks, on machine tools, which is equipped with a compressed air cylinder having its piston through the intervention of a pull rod connected with the adjusting member of the clamping tool is characterized primarily by an auxiliary piston which is adjustable independently of the main piston and which, after the completion of the closing operation of the clamping tool, exerts a blow effect upon the main piston or upon a member connected to the main piston. Due to the shock inherent to the blow effect, all elements of the clamping tool which are in frictional engagement with each other are temporarily loosened for a brief period so that the clamping force of the main piston which still acts upon the adjusting member of the clamping tool will be able to post-clamp the clamping tool whereby a greater clamping force will be exerted on the work piece clamped into the chuck.

According to a further feature of the invention the auxiliary piston is arranged in the hollow pull rod between the main piston and the adjusting member of the clamping tool. Such an arrangement results in a particularly simple and space saving structure. The auxiliary piston is, in conformity with the present invention, provided with a return spring, where as in the feeding line for actuation of the feeding line for actuation of the auxiliary piston there is provided a delay valve. This brings about an automatic return of the auxiliary piston and an adjustable delay in the movement of the auxiliary piston in a particularly simple manner.

Referring now to the drawing, the latter illustrates merely by way of example the clamping tool according to the present invention in the form of a three jaw chuck with a chuck body 1 having radially movably arranged therein the clamping jaws which are each composed of a base jaw 2 and a face 3, said face 3 and said base jaw 2 being interconnected by a screw 4. The base jaws 2 have a hook-shaped portion by means of which they engage a chuck piston or cam 5 which is axially movable and is adapted by means of its inclined guiding surfaces for the base jaws 2 radially to adjust the latter when said piston carries out an axial movement. The jaw chuck is by means of screws 6 connected to the spindle 7 of a machine tool not illustrated. The chuck piston 5 is by means of a pull rod 8 to which it is connected by means of a screw 9 connected to the main piston 10 of a compressed air cylinder 11.

While the chuck body 1 of the jaw chuck is by means of screws 6 directly connected to the spindle 7, the compressed air cylinder 11 has its cylinder bottom 11a by means of flange screws 13 connected to a supporting flange 12 which latter is screwed onto the upper end of the spindle 7. The supply of compressed air to one or the other side of the main piston 10 is effected by an air feeding device 14 known per se which is mounted on a feeding shaft 17 rotating together with the compressed air cylinder 11 but which itself stands still. This air feeding device 14 communicates with two conduits 15 and 16 through which compresed air is in a manner known per se through suitable passages conveyed to the front side or rear side of the main piston 10.

The hollow pull rod 8 has axially displaceably arranged therein an auxiliary piston 18 which by means of a relatively weak tension spring 19 is held in its retracted position shown in the drawing. That side of the auxiliary piston 18 which faces the tension spring 19 communicates with a feeding line 21 through a bore 8a in pull rod 8 and a sleeve 20 sealed relative to the cylinder chamber as well as through a passage 17a in the feeding shaft 17 and through the air feeding device 14. The feeding line 21 is through the intervention of a delay valve 22 connected to the conduit 16 through which compressed air is fed to the air feeding device 14 whereby the main piston 10 is moved into clamping position.

When the jaw chuck is to be closed, compressed air is in a manner known per se conveyed through conduit 16 to the front side (on the right-hand side of the drawing) of the main piston 10 so that the latter will move from the position shown in the drawing toward the left. As a result thereof, the pull rod screwed onto the main piston 10 and the chuck piston 5 are likewise moved toward the left whereby the clamping jaws move radially inwardly. As soon as the stroke of the main piston 10 has been completed, compressed air will through the feeding line 21, with the conduit 16 further remaining under pressure, be passed through passage 17a, sleeve 20 and bore 8a in pull rod 8 to the back side of the auxiliary piston 18. As a result thereof, said piston 18 will instantaneously jump forward (toward the right with regard to the drawing) and a shock-like or blow effect will be exerted upon the clamping tool and the main piston.

Tests have proved that it is irrelevant in which direction the blow effect is exerted upon the clamping tool or the compressed air cylinder 10. The tension spring 19 is so weak that it does not oppose the shock-like forward movement of the auxiliary piston 18 to any material extent. The delay of the supply of compressed air to the bottom side of the auxiliary piston 18 is effected by means of the delay valve 22 in the feeding line 21, said valve 22 may be adjustable.

In view of the shock temporarily and for a short period occurring due to the blow effect, the friction occurring at all guiding surfaces of the clamping tool and of the compressed air cylinder will be eliminated or reduced so that the clamping force which during the blow further acts upon the main piston 10 will bring about a post-clamping of the tool in the chuck. The pull rod 8 is advantageously provided with openings 23 for the escape of the air in front of the auxiliary piston 18 so that this air will not interfere with the blow effect.

The embodiment illustrated in the drawing with the arrangement of the auxiliary piston 18 in the hollow pull rod 8 has the advantage that the compressed air cylinder proper does not require any changes and will not be made more complicated or heavier than an ordinary compressed air cylinder, and that with a corresponding arrangement the blow effect of the auxiliary piston 18 can be exerted in both clamping directions of the clamping tool.

As soon as the overpressure acting upon the bottom side of the auxiliary piston 18 has subsided, the thrust of the tension spring 19 will suffice to return the auxiliary piston 18 to its starting position shown in the drawing. In this way the auxiliary piston 18 will always be in readiness for a new action.

It is, of course, to be understood that the present invention is, by no means, limited to the particular construction shown in the drawing but also comprises any modifications within the scope of the appended claims.

What is claimed is:

1. In a jaw chuck arrangement for machine tools comprising a chuck body and jaws movable radially thereon and cam means in the body connected to said jaws and movable axially of the body to move said jaws radially, a clamping cylinder connected to said body, a clamping piston reciprocable in the clamping cylinder and connected to said cam and valve means for reversibly supplying fluid under pressure to said clamping piston; an auxiliary cylinder operatively connected to said cam and having its axis extending in the direction of movement of the cam, an auxiliary piston in said auxiliary cylinder, and means responsive to the development of predetermined pressure on said clamping piston for causing a supply of pressure fluid to said auxiliary piston to drive said auxiliary piston to one of its end positions and thereby cause said auxiliary piston to deliver an impact on the end of the auxiliary cylinder which will assist the clamping piston in overcoming friction encountered by the paws and cam.

2. An arrangement according to claim 1 which includes a rod connecting said clamping piston to said cam, said auxiliary cylinder being formed in said rod.

3. An arrangement according to claim 2 in which a tension spring is connected between one end of said auxiliary cylinder and said auxiliary piston and the auxiliary piston impacts against the other end of the auxiliary cylinder when actuated.

4. An arrangement according to claim 1 which includes a first conduit leading to said auxiliary cylinder to supply pressure fluid thereto, other conduits leading from said valve means to opposite sides of said clamping piston, and a valve connected between said first conduit and one of said other conduits and responsive to a predetermined pressure in the latter to open and permit a supply of pressure fluid to said auxiliary cylinder and said first conduit.

5. The method of operating a chuck having radially movable jaws, cam means for actuating said jaws, and a fluid pressure operated actuator connected to the cam which comprises; supplying pressure fluid to said actuator to actuate said cam to cause said jaws to move in their opening and closing direction and delivering an impact to the said cam when a certain pressure has developed in said actuator when said cam is moving in jaw closing direction to thereby assist the actuator in overcoming friction encountered by the cam and jaws.

References Cited
UNITED STATES PATENTS 1,118,072 11/1914 Thompson _____ 279—4 XR
2,193,701 7/1961 Arnold.

OTHELL M. SIMPSON, Primary Examiner

DONALD D. EVENSON, Assistant Examiner